US012597089B2

(12) United States Patent
Chen et al.

(10) Patent No.: US 12,597,089 B2
(45) Date of Patent: Apr. 7, 2026

(54) IMAGE PROCESSING METHOD AND APPARATUS AND RELATED DEVICE

(71) Applicant: SHENZHEN ANTELAND TECHNOLOGY CO., LTD, Guangdong (CN)

(72) Inventors: Naiqi Chen, Guangdong (CN); Gang Chen, Guangdong (CN)

(73) Assignee: SHENZHEN ANTELAND TECHNOLOGY CO., LTD, Guangdong (CN)

( * ) Notice: Subject to any disclaimer, the term of this patent is extended or adjusted under 35 U.S.C. 154(b) by 507 days.

(21) Appl. No.: 18/224,169

(22) Filed: Jul. 20, 2023

(65) Prior Publication Data

US 2024/0137666 A1 Apr. 25, 2024
US 2024/0236520 A9 Jul. 11, 2024

(30) Foreign Application Priority Data

Oct. 24, 2022 (CN) .......................... 202211298677.9

(51) Int. Cl.
*H04N 25/585* (2023.01)
*B41J 2/455* (2006.01)
*G06T 1/00* (2006.01)
*G06T 3/40* (2024.01)

(52) U.S. Cl.
CPC .................. *G06T 3/40* (2013.01); *B41J 2/455* (2013.01); *G06T 1/0007* (2013.01)

(58) Field of Classification Search
CPC ..................................................... G06T 5/00
See application file for complete search history.

(56) References Cited

U.S. PATENT DOCUMENTS

| | | | |
|---|---|---|---|
| 12,423,773 B2 * | 9/2025 | Chen ..................... | G06T 1/0007 |
| 2010/0127431 A1 * | 5/2010 | Sandstrom .......... | G03F 7/70291 |
| | | | 264/400 |
| 2011/0222571 A1 * | 9/2011 | Marsh ..................... | B41J 2/451 |
| | | | 372/50.122 |
| 2021/0200079 A1 * | 7/2021 | Luo ..................... | G03F 7/70425 |

FOREIGN PATENT DOCUMENTS

| | | |
|---|---|---|
| CN | 114125335 A | 3/2022 |
| CN | 216595891 U | 5/2022 |
| JP | 2008114473 A | 5/2008 |

OTHER PUBLICATIONS

Yanxiao, et al., "Technology of high precision test for laser spot based on double CCD detection in the outfield," Infrared and Laser Engineering. vol. 44, No. 1. (2015). pp. 59-64.
Chinese Office Action issued Nov. 30, 2022; Chinese Application No. 202211298677.9.

* cited by examiner

*Primary Examiner* — Deandra M Hughes
(74) *Attorney, Agent, or Firm* — McDonald Hopkins LLC

(57) ABSTRACT

An image processing method, apparatus and a related device are provided. The method includes: step 1: setting a resolution of a first image to be exposed as a first resolution K1; step 2: obtaining multiple first offsets, each first offset corresponding to a respective pixel of the first image; step 3: processing the first image to obtain a second image with a greater resolution and setting a second resolution of the second image as K2; step 4, obtaining a third image; and step 5: obtaining a fourth image.

13 Claims, 7 Drawing Sheets d2

IMAGE PROCESSING METHOD AND APPARATUS AND RELATED DEVICE

CROSS-REFERENCE TO RELATED APPLICATION(S)

This application claims priority to Chinese Patent Application No. 202211298677.9 filed Oct. 24, 2022, the disclosure of which is incorporated herein by reference in its entirety.

TECHNICAL FIELD

The present disclosure relates to the field of image processing and, in particular, to an image processing method and apparatus and a related device used in the field of laser direct imaging.

BACKGROUND

Referring to FIG. 1, some components of a laser direct imaging device in the field of laser direct imaging include a first horizontal rail 11, a second horizontal rail 12, a mounting plate 13, and a host computer 14. The first horizontal rail 11 and the second horizontal rail 12 are parallel to the X-axis direction and in parallel with each other. The mounting plate 13 is mounted vertically between the first horizontal rail 11 and the second horizontal rail 12. Multiple lasers 15 of the same size in a column are uniformly mounted on the mounting plate 13. In the present application, the centers of all lasers 15 are assumed to be located on a centerline 130 of a long side of the mounting plate 13 (that is, the mounting error of the lasers on the mounting plate 13 is not considered), and the host computer 14 controls the mounting plate 13 to slide along the first horizontal rail 11 and the second horizontal rail 12 and controls all the lasers 15 to output power to expose a light-sensitive coating which is corresponding to Multiple pixels (FIG. 2 exemplifies 10 rows*1 column of pixels, and black squares indicate the pixels) of the first image in FIG. 2. Under ideal conditions, the mounting plate 13 always moves in an attitude that remains perpendicular to the first horizontal rail 11 and the second horizontal rail 12 as shown in FIG. 1, and all the lasers 15 on the mounting plate 13 are controlled by the host computer 14 to simultaneously output power and expose the light-sensitive coating which is corresponding to the multiple pixels in the same column in FIG. 2.

Referring to FIG. 3, however, because of the unavoidable mounting error that the two ends of the mounting plate 13 are installed at the first horizontal rail 11 and the second horizontal rail 12 severally, the actual attitude of the mounting plate 13 is tilted relative to the ideal attitude that is always perpendicular to the first horizontal rail 11 and the second horizontal rail 12. For example, the mounting plate 13 is tilted forward in a movement direction. Referring to FIG. 4, in this case, if all the lasers output power simultaneously, when the topmost laser 15-1 in FIG. 3 exposes the light-sensitive coating where the pixels in the first row of the first image are located (that is, the first row of the black squares is exposed), the bottommost last laser 15-10 has not yet exposed the light-sensitive coating where the pixels in the last tenth row of the first image are located; and when the bottommost laser 15-10 moves right to the light-sensitive coating where the pixel in the tenth row of the first image is located and exposes the light-sensitive coating, the topmost laser 15-1 has already moved horizontally beyond the exposure range of the first image which causes image exposure delay.

Based on the above analysis, each pixel of the first image in FIG. 2 should be translated to solve the question that the laser exposure delay caused by the tilted mounting plate. Referring to FIG. 5 and FIG. 6, two existing translation solutions are available. In the first translation solution, each pixel in the first image in FIG. 2 is translated by a respective actual obtained first offset (for example, by an actual first offset f1 of the topmost pixel in the vertical column in FIG. 5). Since each first offset is very accurate, the translation displacement of the pixel is currently difficult to be exactly the same as the first offset. In the second translation solution, the pixel is translated by an integer multiple of the size of each pixel in the first image. For example, assuming that the first resolution of the first image in FIG. 5 is 25400 dpi, that is, the size d1 of each pixel is equal to 1 μm, and the first offset f1 of the topmost pixel of the first image in FIG. 5 is 1.49 μm. If the topmost pixel in the vertical column in FIG. 5 is moved by an integer multiple of 1 μm, the pixel can be moved only by an integer multiple of 1 μm, that is to say, by 2*1 μm, that is, 2 μm, and this amount of movement is clearly not in accordance with f1=1.49 μm. Therefore, either because the amount of movement is too accurate to be implemented, or because the amount of movement can only be an integer multiple of the size of the pixel, a large discrepancy exists between the amount of movement and the actual offset in the two methods.

SUMMARY

The present patent application discloses an image processing method to solve the problem of delayed image exposure due to the offset of a mounting plate of a laser on a rail.

To solve the preceding technical problem, an embodiment of the present disclosure provides an image processing method used in the field of laser direct imaging. The method is performed by a laser direct imaging device, wherein the laser direct imaging device comprises a mounting plate, a first horizontal rail and a second horizontal rail, and the first horizontal rail and the second horizontal rail are parallel to a X-axis direction The image processing method includes the steps described below.

In step 1, a resolution of a first image to be exposed is set as a first resolution K1.

In step 2, multiple first offsets are obtained, and each first offset is corresponding to a respective pixel of the first image.

In step 3, the first image is processed to obtain a second image with a second resolution K2, and K2 is greater than K1.

In step 4, a size d2 of any pixel of the second image is calculated according to the second resolution K2, multipliers is obtained by dividing the multiple first offsets obtained in step 2 by d2 separately, a decimal part of each of the multipliers is removed to obtain multiple integer multipliers, d2 is multiplied by the multiple integer multiplier to obtain multiple second offsets, the multiple second offsets are separately multiplied by a multiplier obtained by dividing K1 by K2 to obtain multiple third offsets, and corresponding pixels of the second image are translated according to the multiple third offsets to obtain a third image.

In step 5, a resolution of the third image is restored from the second resolution K2 to the first resolution K1 to obtain a fourth image.

The first image comprises M rows of pixels. M rows of pixels in the first image are exposed by corresponding M lasers of a laser direct imaging device separately, the M lasers are uniformly disposed on a long side centerline of a mounting plate of the laser direct imaging device, the mounting plate is disposed between the first horizontal rail and the second horizontal rail of the laser direct imaging device, and an angle β is an included angle of the mounting plate that is tilted relative to a vertical direction perpendicular to the first horizontal rail and the second horizontal rail.

In some embodiments, determination of the included angle β is as follows: a first linear displacement detection module disposed on the laser direct imaging device detects first displacement a1, where the first displacement a1 is a horizontal offset of a first laser at an end of the mounting plate that is tilted relative to the first laser at the end of the mounting plate that is vertical; and a second linear displacement detection module detects second displacement a2, where the second displacement a2 is a horizontal offset of an M-th laser at another end of the mounting plate that is tilted relative to the M-th laser at the another end of the mounting plate that is vertical, the distance between the first laser and the M-th laser is d, and $$\beta = arctg\frac{a1 + a2}{d}$$

according to an inverse tangent formula.

In some embodiments, the obtaining multiple first offsets includes the steps described below.

In step 21, a sidelength of each pixel of the first image is determined as d1 μm, where d1=25400/K1, the distance between every two adjacent lasers is d1, and d=(M−1)*d1; and an intersection point of a long side centerline of the mounting plate in a vertical state and a long side centerline of the mounting plate in a tilted state is set as point D, and a laser located at the point D is set as a reference laser, where a horizontal displacement of the reference laser is not changed when the mounting plate is deflected from the vertical state to the tilted state.

In step 22, the distance from a Q-th laser among (M−1) lasers other than the reference laser to the reference laser is set as $S_Q$, and horizontal displacement of the Q-th laser is set as $f_Q$, where $f_Q=S_Q*tgβ$.

In step 23, pixels in each column in the first image corresponding to the Q-th laser are moved with a horizontal offset of $f_Q$ in a reverse direction to obtain the multiple first offsets.

The reverse direction refers to a direction opposite to an offset direction of the lasers, Q is a variable, and 1≤Q≤M−1.

In some embodiments, in step 23, the pixel corresponding to the Q-th laser refers to a pixel exposed by the Q-th laser.

In some embodiments, in step 4, the translating corresponding pixels of the second image according to the multiple third offsets to obtain the third image is automatically implemented under a control of a host computer in the laser direct imaging device.

The present disclosure further discloses an image processing apparatus. The image processing apparatus includes a first image processing module, a calculation module, a second image acquisition module, a third image acquisition module, and a fourth image acquisition module.

The first image processing module is configured to set a resolution of a first image as a first resolution K1.

The calculation module is configured to obtain multiple first offsets, and each first offset corresponding to a respective pixel of the first image.

The second image acquisition module is configured to process the first image into a second image with a second resolution K2, wherein K2 is greater than K1.

The third image acquisition module is configured to calculate a size d2 of any pixel of the second image according to the second resolution K2, obtain multipliers by dividing the multiple first offsets by d2 separately, remove a decimal part of each of the multipliers to obtain multiple integer multipliers, multiply d2 by the multiple integer multipliers to obtain multiple second offsets, separately multiply the multiple second offsets by a multiplier obtained by dividing K1 by K2 to obtain multiple third offsets, and translate corresponding pixels of the second image according to the multiple third offsets to obtain a third image.

The fourth image acquisition module is configured to restore a resolution of the third image from the second resolution K2 to the first resolution K1 to obtain a fourth image.

An angle β is an included angle of a mounting plate that spans the first horizontal rail and the second horizontal rail in a laser direct imaging device and is tilted relative to a vertical direction perpendicular to the first horizontal rail and the second horizontal rail, $$\beta = arctg\frac{a1 + a2}{d},$$

first displacement a1 denotes a horizontal offset of a first laser at an end of the mounting plate that is tilted relative to the first laser at the end of the mounting plate that is vertical, and second displacement a2 denotes a horizontal offset of an M-th laser at another end of the mounting plate that is tilted relative to the M-th laser at the another end of the mounting plate that is vertical.

In some embodiments, the calculation module configured to obtain a plurality of first offsets in the following manner.

In step 21, a sidelength of each pixel of the first image is determined as d1 μm, where d1=25400/K1, the distance between every two adjacent lasers is d1, and d=(M−1)*d1; and an intersection point of a long side centerline of the mounting plate in a vertical state and a long side centerline of the mounting plate in a tilted state is set as point D, and a laser located at the point D is set as a reference laser, where a horizontal displacement of the reference laser is not changed when the mounting plate is deflected from the vertical state to the tilted state.

In step 22, the distance from a Q-th laser among (M−1) lasers other than the reference laser to the reference laser is set as $S_Q$, and horizontal displacement of the Q-th laser is set as $f_Q$, where $f_Q=S_Q*tgβ$.

In step 23, pixels in each column of the first image corresponding to the Q-th laser are moved by a horizontal offset of $f_Q$ in a reverse direction to obtain the multiple first offsets.

The present disclosure further discloses a storage medium. The storage medium stores a computer program, where when executed by a processor, the computer program causes the processor to perform the image processing method.

The present disclosure further discloses a computer device. The computer device includes a memory, a processor, and a computer program stored in the memory and executable by the processor, where the processor, when executing the program, performs the image processing method.

In the preceding technical solutions, the method and apparatus, a storage medium, and a computer device provided in the present disclosure all achieve the technical effects described below. Since the mounting plate is deflected on the first horizontal rail and the second horizontal rail, the mounting plate is no longer perpendicular to the first horizontal rail and the second horizontal rail, and the column of lasers on the mounting plate are deflected with the deflection of the mounting plate as a whole. If the first image is exposed by the deflected lasers, the lasers expose the same column of pixels of the first image at different times. Therefore, multiple pixels in each column of the first image need to be horizontally translated in a reverse direction relative to an offset direction of the lasers. Although the horizontal displacement of each pixel can be accurately calculated, if the two methods of pixel movement mentioned in the BACKGROUND are adopted, one of the two methods is not possible to implement, and in the other method, a large discrepancy exists between the movement displacement and the actual displacement of the pixel. Therefore, the first image is first processed to obtain the second image with a greater resolution, multiple obtained first offsets are divided by the size of the pixel of the second image to obtain multiple multipliers, the decimal part of each multiplier is removed (that is, each multiplier is rounded down) to obtain multiple integer multipliers, the size of the pixel of the second image is multiplied by the multiple integer multipliers to obtain multiple second offsets, the multiple second offsets are multiplied by a multiplier obtained by dividing the first resolution K1 of the first image by the second resolution K2 of the second image to obtain multiple third offsets, corresponding pixels of the second image are translated according to the multiple third offsets to obtain the third image, and the resolution of the third image is restored from the second resolution K2 to the first resolution to obtain the fourth image. image

BRIEF DESCRIPTION OF DRAWINGS

To illustrate the technical solutions in embodiments of the present disclosure or the related art more clearly, the drawings used in the description of the embodiments or the related art are briefly described below. Apparently, the drawings described below illustrate only part of the embodiments of the present disclosure, and those of ordinary skill in the art may obtain other drawings based on the drawings described below on the premise that no creative work is done.

DETAILED DESCRIPTION

Figure 1:
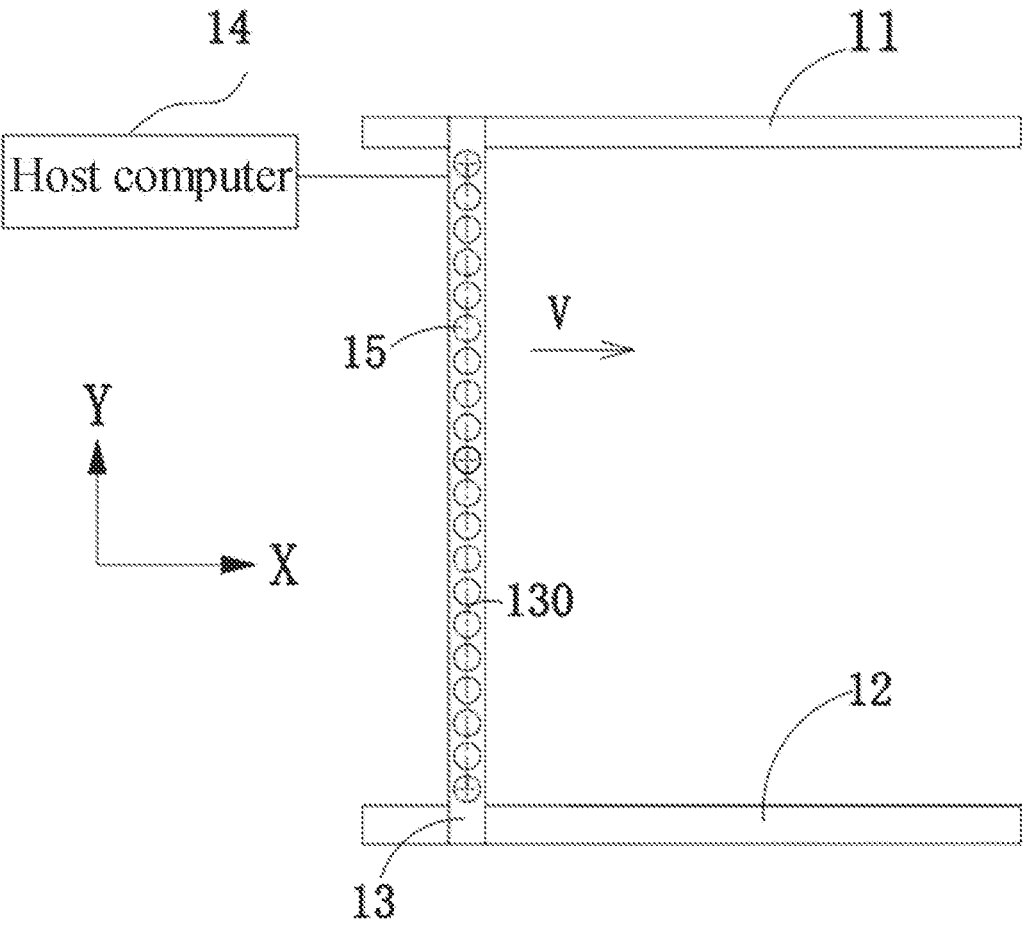
FIG. 1 is a structural view illustrating that a mounting plate 13 is perpendicular to two horizontal rails in a laser direct imaging device.

Embodiments of the present disclosure are further described in detail below in conjunction with the drawings and embodiments. The detailed description of the following embodiments and the drawings are used for exemplarily illustrating the principles of the present disclosure, but are not intended to limit the scope of the present disclosure. The present disclosure may be implemented in many different forms and is not limited to the particular embodiments disclosed herein, but includes all technical solutions that fall within the scope of the claims.

The present disclosure provides these embodiments in order to make the present disclosure thorough and complete and to fully express the scope of the present disclosure to those skilled in the art. It is to be noted that unless otherwise specified, the relative arrangement of components and steps, components of materials, numerical expressions, and values set forth in these embodiments should be interpreted as merely exemplary and not as limitations.

It is to be noted that in the description of the present disclosure, unless otherwise noted, "a plurality" means greater than or equal to two; orientations or position relations indicated by terms "up", "down", "left", "right", "inside", "outside", and the like are only to facilitate and simplify the description of the present disclosure and do not indicate or imply that a device or element referred to must have a particular orientation or must be constructed and operated in a particular orientation. Thus, these orientations or position relations are not to be construed as limiting the present disclosure. When the absolute position of the described object is changed, the relative position relation may be changed accordingly.

Additionally, the terms "first", "second", and the like in the present disclosure are used for distinguishing between different components but not used for describing any order, quantity, or significance. "Vertical" is not strictly vertical, but within the tolerance range. "Parallel" is not strictly parallel, but within the tolerance range. The word "include", "contain", or the like means that an element preceding the word covers elements listed after the word and does not exclude the possibility that other elements are covered.

Further, it is to be noted that, in the description of the present disclosure, unless otherwise expressly specified and limited, the term "mounted", "connected to each other", or "connected" is to be construed in a broad sense, for example, as securely connected, detachably connected or internally connected, or directly connected or indirectly connected through an intermediary. For those of ordinary skill in the art, specific meanings of the preceding terms in the present disclosure may be understood based on specific situations. When a particular device is described to be located between a first device and a second device, an interposed device may or may not exist between the particular device and the first device or the second device.

All terms used in the present disclosure have the same meanings as understood by those of ordinary skill in the art to which the present disclosure belongs, unless otherwise specifically defined. Further, it is to be understood that terms defined in, for example, a generic dictionary should be interpreted as having meanings consistent with their meanings in the context of the related art, and should not be interpreted in an idealized or extremely formalized sense, unless explicitly defined as such herein.

The technology, method, and apparatus known to those of ordinary skill in the related art may not be discussed in detail, but in the appropriate case, the technology, method, and apparatus should be considered as part of the specification.

The present disclosure discloses an image processing method used in the field of laser direct imaging.

The method includes the steps described below.

The image processing method used in the field of laser direct imaging includes the steps described below.

In step 1, a resolution of a first image to be exposed is set as a first resolution K1.

In step 2, multiple first offsets are obtained, and each first offset corresponding to a respective pixel of the first image.

In step 3, the first image is processed to obtain a second image with a second resolution K2, and K2 is greater than K1.

In step 4, a size d2 of any pixel of the second image is calculated according to the second resolution K2, multipliers are obtained by dividing the multiple first offsets by d2 separately; a decimal part of each of the multipliers is removed to obtain multiple integer multipliers, d2 is multiplied by the multiple integer multipliers to obtain multiple second offsets, the multiple second offsets are separately multiplied by a multiplier obtained by dividing K1 by K2 to obtain multiple third offsets, and corresponding pixels of the second image are translated according to the multiple third offsets to obtain a third image.

In step 5, a resolution of the third image is restored from the second resolution K2 to the first resolution K1 to obtain a fourth image.

The first image comprises M rows of pixels, and M rows of pixels in the first image are exposed by corresponding M lasers of a laser direct imaging device separately, the M lasers are uniformly disposed on a long side centerline of a mounting plate of the laser direct imaging device, the mounting plate is disposed between the first horizontal rail and the second horizontal rail of the laser direct imaging device, and an angle β is an included angle of the mounting plate that is tilted relative to a vertical direction perpendicular to the first horizontal rail and the second horizontal rail.

Figure 2:
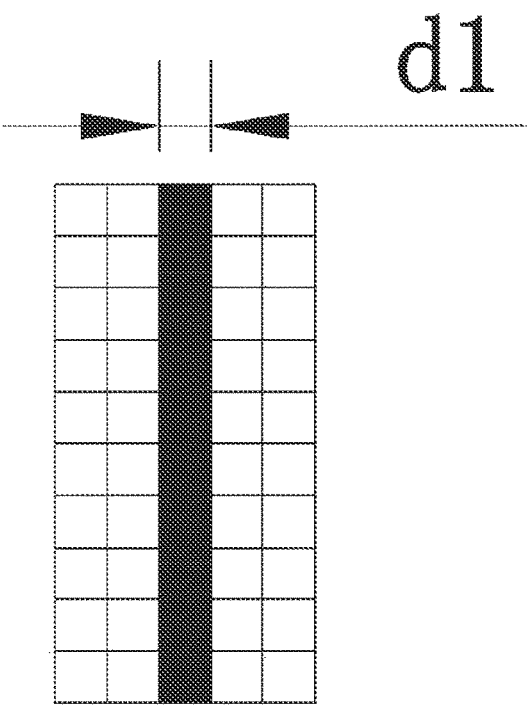
FIG. 2 is a schematic diagram of a first image including 10 rows*1 column of pixels according to an embodiment of the present disclosure.

In step 1, referring to FIG. 2, the first image to be exposed includes M rows*N columns of pixels. In some embodiments, M=10 and N=1, the first image exemplarily includes 10 rows*1 column of pixels, that is, a total of 10 pixels. These 10 pixels are each exposed by 10 lasers of the same size uniformly mounted on the mounting plate 13 in FIG. 1. That is to say, when the mounting plate 13 moves horizontally to the right on the first horizontal rail 11 and the second horizontal rail 12, the 10 lasers 15 of the same size on the mounting plate 13 expose the 10 corresponding pixels of the first image in FIG. 2.

Figure 3:
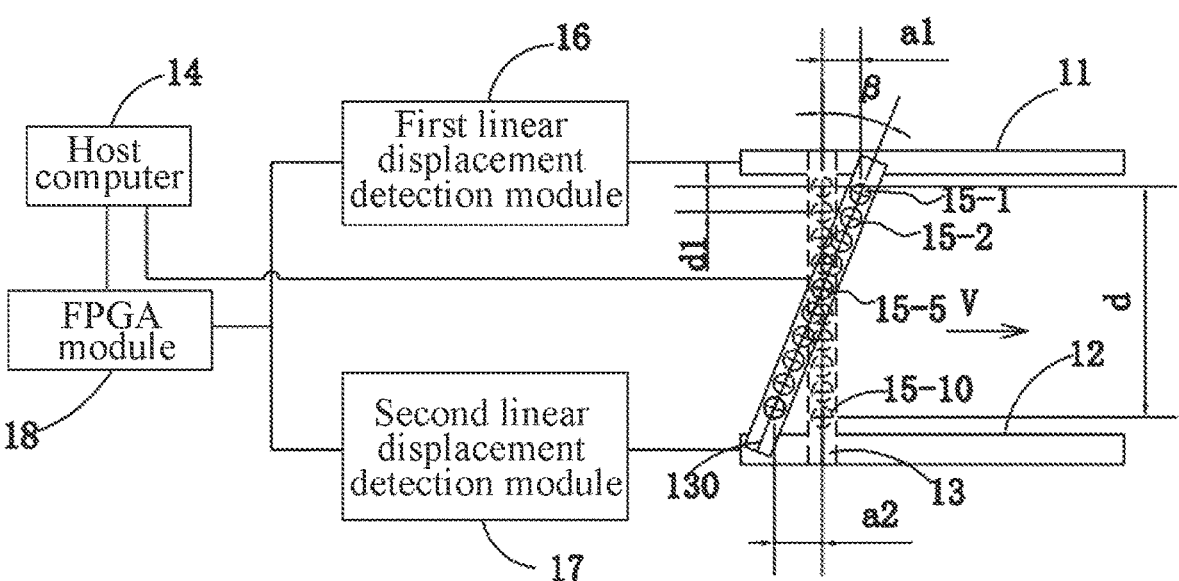
FIG. 3 is a schematic diagram of module connections of an image processing apparatus according to an embodiment of the present disclosure.
Figure 4:
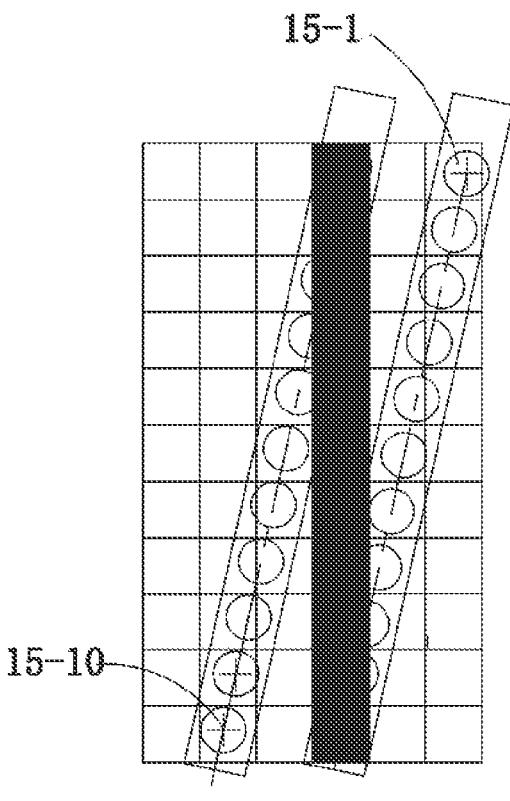
FIG. 4 is a schematic diagram of a first image exposed by multiple lasers on a tilted mounting plate.

Referring to FIG. 3, the mounting plate 13 is deflected on the first horizontal rail 11 and the second horizontal rail 12, that is, the mounting plate 13 is no longer perpendicular to the first horizontal rail 11 and the second horizontal rail 12. Therefore, to expose the first image shown in FIG. 2, the first image needs to be processed. In FIG. 3, it is assumed that an angle β is an included angle of the mounting plate 13 that is tilted relative to a vertical direction perpendicular to the first horizontal rail 11 and the second horizontal rail 12, then it is to be understood that all pixels of the first image in FIG. 2 need to be translated in a direction opposite to a horizontal offset direction of the lasers to obtain a tilted ideal exposure image (that is, an tilted image consisting of pixels) shown in FIG. 5. That is to say, if the mounting plate 13 is deflected to the right by the angle β, the ideal exposure image after the offset theoretically needs to be deflected to the left by the angle β relative to the first image. Therefore, the accurate calculation of the angle of deflection β is the key to the accurate translation of each pixel of the first image.

Referring to FIG. 3, when the mounting plate 13 is deflected to the right, a first linear displacement detection module 16 disposed on the first horizontal rail 11 detects first displacement a1, where the first displacement a1 is a horizontal offset of the topmost first laser 15-1 on the mounting plate 13; and a second linear displacement detection module 17 disposed on the second horizontal rail 12 detects second displacement a2, where the second displacement a2 is a horizontal displacement of the bottommost tenth laser 15-10 on the mounting plate 13, and a2 is not necessarily equal to a1. The distance between the laser 15-1 and the laser 15-10 is set as d. The data a1, a2, and d are sent to the host computer 14 through a field-programmable gate array (FPGA) module 18, and the host computer 14 calculates β according to the inverse tangent formula, where β is equal to $$\arctg\frac{a1+a2}{d}.$$

It is to be noted that the angle of deflection β is constant when the host computer 14 controls the mounting plate 13 to move horizontally to the right, that is, the mounting plate 13 keeps the same tilted attitude on the first horizontal rail 11 and the second horizontal rail 12 to move horizontally to the right.

Step 2 may specifically include the steps described below.

In step 21, a sidelength of any pixel of the first image is determined as d1 μm, where d1=25400/K1, the distance between every two adjacent lasers is d1, and d=(M−1)*d1; and an intersection point between a long side centerline of the mounting plate in a vertical state and a long side centerline of the mounting plate in a tilted state is set as point D, and a laser located at the point D is set as a reference laser, where a horizontal displacement of the reference laser is not changed when the mounting plate is deflected from the vertical state to the tilted state.

In step 22, the distance from the Q-th laser among (M−1) lasers other than the reference laser to the reference laser is set as $S_Q$, and horizontal displacement of the Q-th laser is set as $f_Q$, where $f_Q = S_Q * tg\beta$.

In step 23, pixels in each column in the first image corresponding to the Q-th laser are moved by a horizontal offset of $f_Q$ in a reverse direction to obtain the multiple first offsets.

Figure 6:
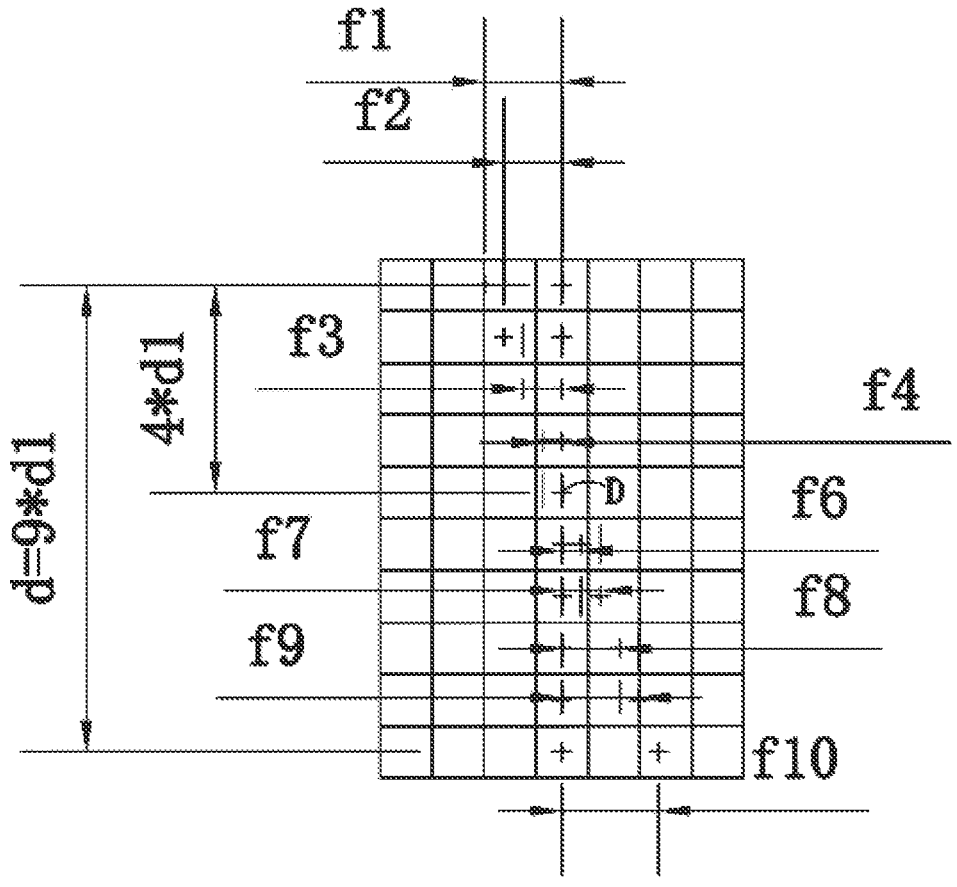
FIG. 6 is a schematic diagram of coordinate offsets when the pixels are offset in FIG. 5.

In step 21, the first resolution of the first image in FIG. 2 is set as K1, the sidelength of any pixel constituting the first image is set as d1 μm, d1=25400/K1 according to the definition of the resolution, and every two adjacent lasers are spaced apart by d1, where d=(M−1)*d1. Referring to FIG. 6, in some embodiments, M is 10, the intersection point of a long side centerline 130 of the mounting plate 13 in a vertical state and a long side centerline 130 of the mounting plate 13 in a tilted state is set as point D, the laser 15-5 located at the point D (that is, the fifth laser from top to bottom) is set as the reference laser, and a horizontal displacement of the reference laser is not changed when the mounting plate 13 is tilted relative to when the mounting plate 13 is vertical. In some embodiments, the first resolution K1 of the first image is set as 25400 dpi, thus d1=1 μm.

Figure 5:
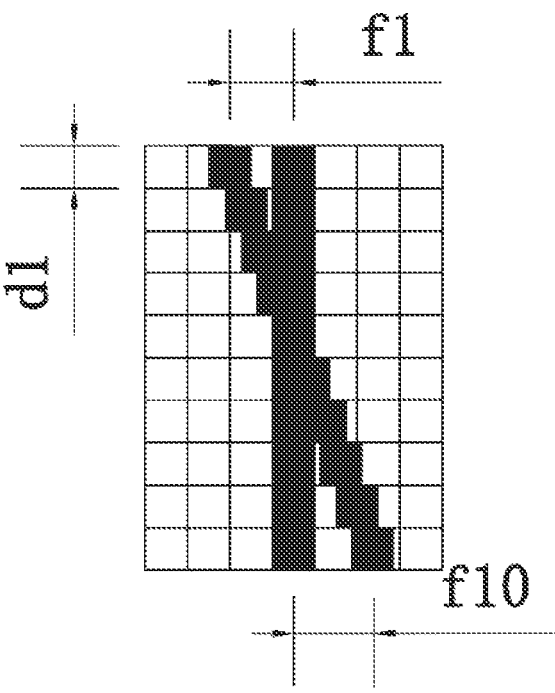
FIG. 5 is an ideal image obtained by moving pixels in a first image according to first offsets.

1) For step 22, reference is made to FIG. 3, FIG. 3 and FIG. 5. A schematic diagram of the horizontal movement of the 10 pixels in the first image in FIG. 2 is shown in FIG. 5 and FIG. 6. In FIG. 5, a vertical column of black squares represent the first image, and an image formed by multiple black squares and tilted to the left relative to the first image is the ideal exposure image obtained by moving the corresponding pixels of the first image by the first offsets. As can be seen from FIG. 3, the distance between every two adjacent lasers is the same as the size d1 of one pixel. The number of lasers on the mounting plate 13 is equal to the number of rows of pixels in the first image to be exposed, that is, when the mounting plate 13 moves horizontally to the right, each laser exposes all the pixels in the corresponding row of the first image. For example, the first laser 15-1 exposes all the pixels in the first row of the first image, and the second laser 15-2 exposes all the pixels in the second row. In the present application, the number of the lasers 15 is, for example, 10, so the number M of rows of the first image is also 10. The distance S1 from the first laser 15-1 to the fifth reference laser 15-5 from top to bottom of the mounting plate 13 in FIG. 3 is equal to 4*d1. When the mounting plate 13 is taken point D as the rotation point and deflected to the right by Angle β, the laser 15-1 is horizontally displaced to the right by an offset of f1, f1=a1, and then the first pixel from top to bottom in FIG. 5 needs to be translated to the left by an offset of f1. The distance $S_2$ from the second laser 15-2 to the reference laser 15-5 is equal to 3*d1. The second laser is horizontally displaced to the right by an offset distance of f2, where f2=S2*tgβ=3*d1*(a1+a2)/d. Moreover, since d=9*d1, f2=(a1+a2)*3/9. The second pixel from top to bottom in FIG. 5 needs to be translated to the left by f2. By analogy, the third pixel in FIG. 5 needs to be translated to the left by f3, where f3=2*d1*(a1+a2)/d=(a1+a2)*2/9; the fourth pixel needs to be translated to the left by f4, where f4=(a1+a2)*1/9; the fifth pixel needs to be translated to the left by f5, where f5=0; the sixth pixel needs to be translated to the right by f6, where f6=(a1+a2)*1/9; the seventh pixel needs to be translated to the right by f7, where f7=(a1+a2)*2/9; the eighth pixel needs to be translated to the right by f8, where f8=(a1+a2)*3/9; the ninth pixel needs to be translated to the right by f9, where f9=(a1+a2)*4/9; and the tenth pixel needs to be translated to the right by f10, where f10=(a1+a2)*5/9. Moreover, since the first displacement can be detected by the first linear displacement detection module 16 and the second displacement a2 can be detected by the second linear displacement detection module 17, f1 to f10 can be calculated. In some embodiments, f1=−a1=−1.490 μm, and f10=a2=1.862 μm. The remaining values are as follows: f2=—(a1+a2)*3/9=−1.117 μm, f3=−(a1+a2)*2/9=−0.745 μm, f4=−0.372 μm, f5=0, f6=0.372 μm, f7=0.745 μm, f8=1.117 μm, f9=1.490 μm, and f10=a2=1.862 μm. The positive or negative sign in front of each value indicates the offset direction of each pixel relative to a starting position, with leftward offset defined as negative and rightward offset defined as positive. f1 to f10 are set as 10 first offsets.

Referring to FIG. 6, after the 10 first offsets from f1 to f10 are calculated, if these 10 pixels are directly translated based on the first image, the pixels in each row can be moved only by an integer multiple of the size of each pixel every time, which is different from the actually calculated translation distance, resulting in an error in the translation distance of the pixels. If the actually calculated distance is used as a translation value, it is impossible to move the pixels according to the actually calculated translation value since the translation value is too accurate. For example, in some embodiments, the first resolution of the first image (that is, an image consisting of a vertical column of pixels) in FIG. 5 is 25400 dpi, the size d1 of each pixel is equal to 1 μm, and f1 of the topmost pixel is 1.49 μm, that is, a1=1.49 μm. If the topmost pixel in the vertical column in FIG. 5 is moved by an integer multiple of 1 μm, the topmost pixel in the vertical column can be moved to the left only by 1 μm and then moved by 1 μm, and the total amount of movement is 2 μm (that is, the amount of movement can only be an integer multiple of the size of the pixel) and is apparently different from the actual distance f1 that is equal to 1.49 μm. If the topmost pixel in the vertical column is translated directly according to f1=1.49 μm, in fact, it is difficult to do such an accurate translation. This also occurs for the movement of the remaining pixels in the vertical column in FIG. 5.

To solve the preceding problems, the present patent application adopts the method described below to solve the problems.

Figure 7:
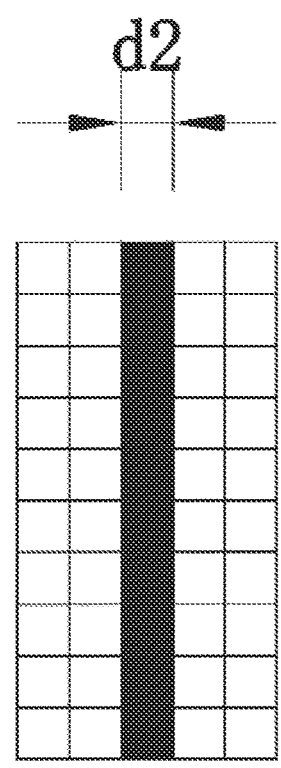
FIG. 7 is a schematic diagram of a second image.
Figure 8:
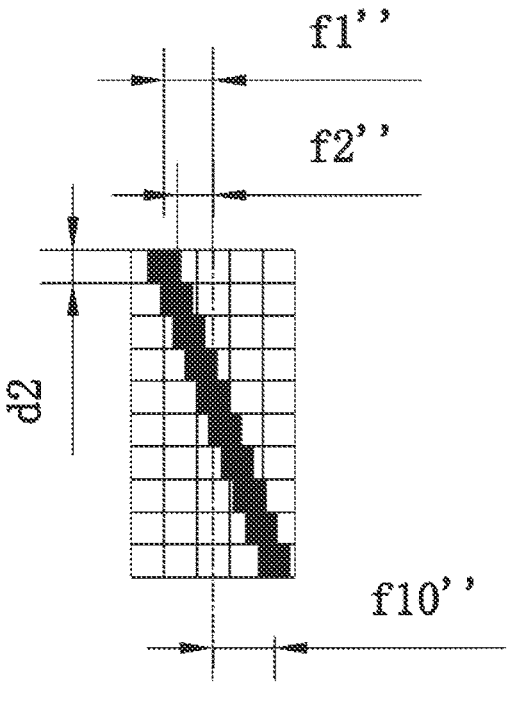
FIG. 8 is a schematic diagram of a third image obtained by translating pixels in a second image.
Figure 9:
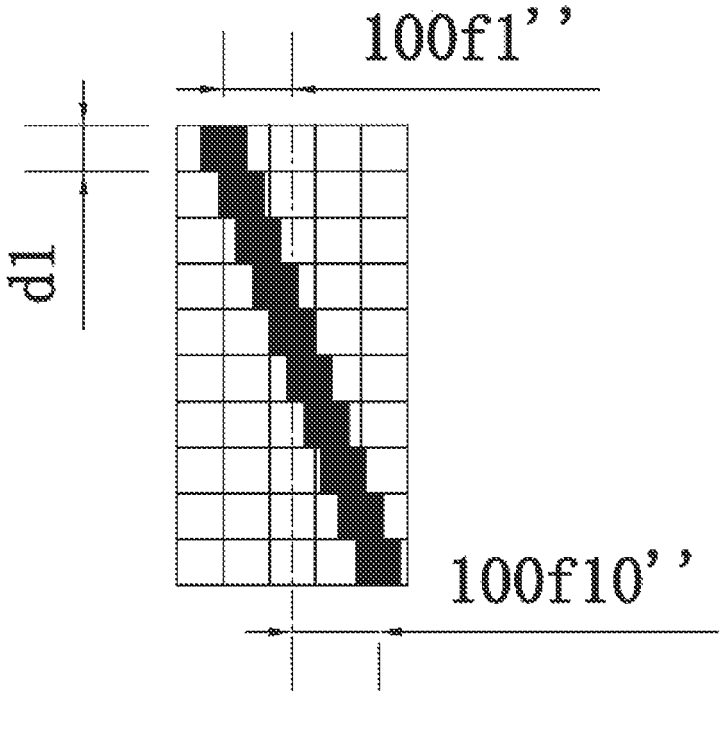
FIG. 9 shows a fourth image obtained by restoring the resolution of the third image in FIG. 8 to K1.

First, the first image in FIG. 2 (that is, the image consisting of a vertical column of pixels in FIG. 5) of the first resolution K1 is processed to obtain the second image with a greater resolution as shown in FIG. 7, and the second resolution of the second image is set as K2. K2 is an integer multiple of K1. The larger the ratio of K2 to K1, the greater the second resolution of the second image, and the more accurate the final result of image movement. In some embodiments, K1 is 25400 dpi, and K2 is 2540000 dpi, that is, K2=100 K1. The size d2 of any pixel in the second image in FIG. 7 satisfies that d2=25400/K2=0.01 μm. The 10 calculated first offsets from f1 to f10 are: −1.490, −1.117, −0.745, −0.372, 0, 0.372, 0.745, 1.117, 1.490, and 1.862 (all in microns) in sequence. These 10 first offsets are separately 149 times, 111.7 times, 74.5 times, 37.2 times, 0 times, 37.2 times, 74.5 times, 111.7 times, 149 times, and 186.2 times of 0.01 μm. Therefore, the decimal parts of these 10 multipliers are removed to obtain integer multipliers of 0.01 μm, which are 149 times, 111 times, 74 times, 37 times, 74 times, 111 times, 149 times, and 186 times, and then d2 (that is, 0.01 μm) is multiplied by these 10 integer multipliers to obtain 10 second offsets f1' to f10' (the offset direction remains the same and all units are in microns), which are −1.49, −1.11, −0.74, −0.37, 0, 0.37, 0.74, 1.11, 1.49, and 1.86. The 10 second offsets are multiplied by a multiplier 0.01 (the multiplier 0.01 is obtained by dividing K1 by K2) to obtain 10 third offsets f1" to f10" (all in microns), which are −0.0149, −0.0111, −0.0074, −0.0037, 0, 0.0037, 0.0074, 0.0111, 0.0149, and 0.0186. The 10 pixels of the second image in FIG. 7 are translated according to the 10 third offsets f1" to f10" (in this case, the size d2 of each pixel is 0.01 μm) to obtain the third image shown in FIG. 8, and the resolution of the third image is still K2, that is, the size of each pixel is still d2. Finally, the resolution of the third image is restored from K2 (2540000 dpi) to K1 (25400 dpi) to obtain the fourth image shown in FIG. 9. It is to be understood that the resolution of the fourth image in FIG. 9 is K1, that is, the size of each pixel is still d1, that is, 1 μm, but the offset distance of each pixel in the fourth image is no longer equal to the calculated ideal offset distance of the corresponding pixel in FIG. 5 (except for the fifth pixel that does not move) since the decimal part of the multiplier is removed and the integer part of the multiplier is retained. For example, the offset distance of the topmost pixel in FIG. 9 is 100f1" and is no longer equal to the offset distance f1 of the topmost pixel in FIG. 5. The offset distance 100f1" of the topmost pixel in FIG. 9 is expanded by a factor of 100 relative to the third offset f1" of the topmost pixel in the third image in FIG. 8. The multiplier 100 is obtained by dividing the second resolution K2 by the first resolution K1.

It is to be noted that the case where the first image in FIG. 2 is of 10 rows×1 column is only an example, that is, the case where M=10 and N=1 is only an example. In fact, in the case where the first image is divided into M rows×N columns, M and N may be other values. For a multi-column image, the processing method is the same as that for only 1 column in FIG. 2. In the method, the first column of the image is processed first, and then the remaining columns of the image are processed. In addition, the case where the number M of the lasers is 10 is only an example. In the case where the number M of the lasers is another value, the number M of rows of the first image in FIG. 2 corresponds to the number M of the lasers, that is, it is ensured that one laser exposes the all pixels in the corresponding row. In addition, the case where it is set that the fifth pixel from top to bottom of the first image in FIG. 5 does not move is an example. The case where the second resolution K2 of the second image in FIG. 7 is 100 times the first resolution K1 of the first image in FIG. 2 is an example. In fact, the multiplier may be 5, 10, or 12, which is not limited here as long as it satisfies that K2 is greater than K1.

In the present application, when the mounting plate 13 is deflected, only the deflection of all lasers in the horizontal direction is considered, and the change of coordinates in the vertical direction (Y direction) is ignored. Therefore, only the horizontal displacement of the pixels is considered during image processing. In addition, the line connecting the centers of all lasers is always located on the centerline 130 of the long side of the mounting plate 13, independent of whether the mounting plate is deflected or not.

In some embodiments, the first linear displacement detection module 16 and the second linear displacement detection module 17 both are gratings or both are scales. The gratings or the scales can accurately detect the first displacement a1 and the second displacement a2. Similarly, the value of d and the distance $S_{(M-1)}$ from any laser $Q_{(M-1)}$ to the reference laser can be calculated accurately. In some embodiments, d and $S_{(M-1)}$ may be acquired through design drawings or actual measurements.

The image processing method disclosed in the present disclosure has the advantages described below. Since the mounting plate is deflected on the first horizontal rail and the second horizontal rail and thus no longer perpendicular to the first horizontal rail and the second horizontal rail, the column of lasers on the mounting plate are deflected with the deflection of the mounting plate as a whole. If the first image of M rows*N columns is exposed by the deflected lasers, the time that the deflected lasers expose the same column of pixels of the first image is not synchronized. Therefore, multiple pixels in each column of the first image need to be horizontally translated in a reverse direction relative to an offset direction of the lasers. Although the horizontal displacement of each pixel can be accurately calculated, if the two methods of pixel movement mentioned in the BACKGROUND are adopted, one of the two methods is not possible to implement, and in the other method, a large discrepancy exists between the movement displacement and the actual displacement of the pixel. Therefore, in the application, the first image is first processed into the second image with a greater resolution, multiple obtained first offsets are divided by the size of the pixel of the second image to obtain multiple multipliers, multiple integer multipliers are obtained by removing the decimal part of each multiplier and by retaining the integer part of each multiplier, the size of the pixel of the second image is multiplied by the multiple integer multipliers to obtain multiple second offsets, the multiple second offsets are multiplied by a multiplier obtained by dividing the first resolution K1 of the first image by the second resolution K2 of the second image to obtain multiple third offsets, corresponding pixels of the second image are translated according to the multiple third offsets to obtain the third image, and the resolution of the third image is restored from the second resolution K2 to the first resolution to obtain the fourth image. Therefore, although the accuracy of the fourth image is not comparable to the ideal image (see the tilted image consisting of the black pixels in FIG. 5) obtained by translating the corresponding pixels of the first image according to the multiple first offsets, the fourth image is much more accurate than the result obtained by separately translating the pixels according to the multiple first offsets with an integer multiple of the size d1 of the pixel of the first image as the offset. Therefore, the method improves the image processing accuracy.

Figure 10:
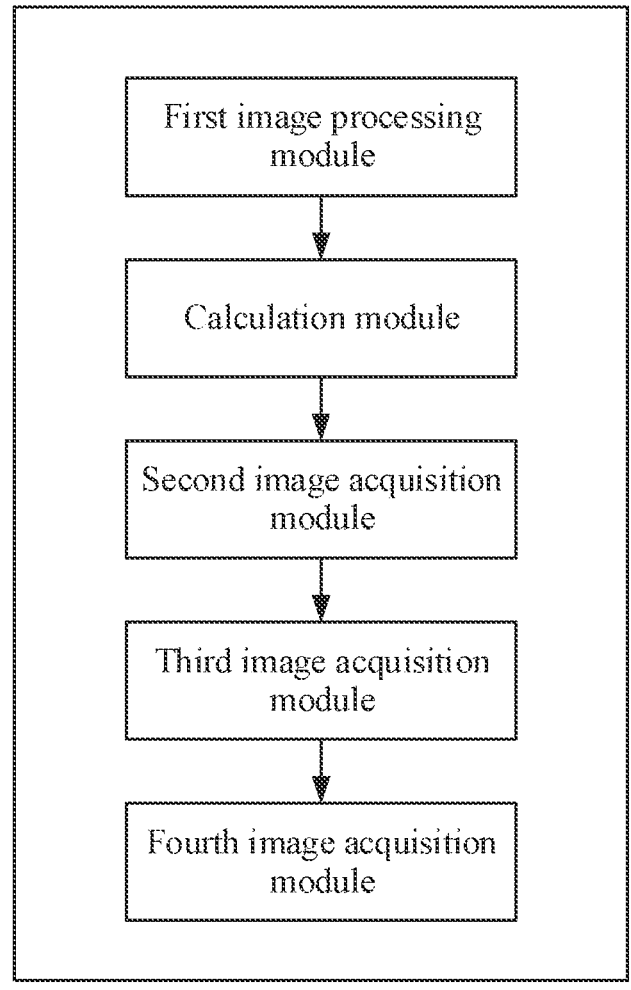
FIG. 10 is a diagram of modules of an image processing apparatus according to the present disclosure.

Referring to FIG. 10, the present disclosure further discloses an image processing apparatus. The image processing apparatus includes a first image processing module, a calculation module, a second image acquisition module, a third image acquisition module, and a fourth image acquisition module.

The first image processing module is configured to set a resolution of a first image as a first resolution K1.

The calculation module is configured to obtain multiple first offsets; each first offset is corresponding to a respective pixel of the first image. For the calculation of multiple first offsets, reference may be made to the preceding specific solution process for f1 to f10. The details are not repeated here.

The second image acquisition module is configured to process the first image to obtain a second image with a second resolution K2, wherein K2 is greater than K1. In the present application, the resolution of the first image is set as the first resolution K1, for example, 25400 dpi, and the second resolution K2 of the second image is, for example, 2540000 dpi, where K2=100K1.

The third image acquisition module is configured to calculate a size d2 of any pixel of the second image according to the second resolution K2, obtain a plurality of multipliers by dividing the multiple first offsets by d2 separately, remove a decimal part of each of the plurality of multipliers to obtain multiple integer multipliers, multiply d2 by the multiple integer multipliers to obtain multiple second offsets, multiply the multiple second offsets by a multiplier obtained by dividing K1 by K2 to obtain multiple third offsets, and translate corresponding pixels of the second image according to the multiple third offsets to obtain a third image. The process of obtaining the third image is described in detail earlier and is not repeated here.

The fourth image acquisition module is configured to restore a resolution of the third image from the second resolution K2 to the first resolution to obtain a fourth image.

The technical effects achieved by the apparatus are exactly the same as the technical effects achieved by the method described above and are not repeated here.

The present disclosure further provides a storage medium. The storage medium stores a computer program which, when executed by a processor, causes the processor to perform the method in steps 1 to 5. The storage medium refers to a carrier for storing data, for example, a floppy disk, a compact disc (CD), a digital video disc (DVD), a hard disk, a flash memory, a universal serial bus (USB), a Compact-Flash (CF) card, a secure digital (SD) card, a MultiMedia-Card (MMC), a SmartMedia (SM) card, a memory stick, an xD-Picture Card, and the like. The popular storage medium is based on the NAND flash memory, such as the USB, the CF card, the SD card, a Secure Digital High Capacity (SDHC) card, the MMC, the SM card, the memory stick, or the xD-Picture card.

The present disclosure further discloses a computer device. The computer device includes a memory, a processor, and a computer program stored in the memory and executable by the processor. The processor, when executing the program, performs steps 1 to 5 described above. The processor includes a kernel, and the kernel retrieves corresponding program units from the memory. One or more kernels may be provided. The memory may include a non-permanent memory in the computer-readable medium, a random-access memory (RAM), and/or a non-volatile memory, such as a read-only memory (ROM) or a flash RAM, and the memory includes at least one memory chip.

So far, the embodiments of the present disclosure are described in detail. To avoid obscuring the concept of the present disclosure, some details well known in the art are not described. Based on the preceding description, those skilled in the art can fully understand how to implement the technical solutions disclosed herein.

Although some embodiments of the present disclosure are described in detail through examples, those skilled in the art should understand that the preceding examples are for description only, rather than limiting the scope of the present disclosure. Those skilled in the art should understand that the preceding embodiments can be modified or some technical features can be equivalently replaced without departing from the scope and spirit of the present disclosure. In particular, as long as there is no structural conflict, the technical features mentioned in the various embodiments can be combined in any manner.

What is claimed is:

1. An image processing method used in a field of laser direct imaging, the method is performed by a laser direct imaging device, wherein the laser direct imaging device comprises a mounting plate, a first horizontal rail and a second horizontal rail, and the first horizontal rail and the second horizontal rail are parallel to a X-axis direction; the method comprising:

step 1: setting a resolution of a first image to be exposed as a first resolution K1;

step 2: obtaining a plurality of first offsets, each first offset is corresponding to a respective pixel of the first image;

step 3: processing the first image to obtain a second image with a second resolution K2, wherein K2 is greater than K1;

step 4: calculating size d2 of any pixel of the second image according to the second resolution K2; obtaining a plurality of multipliers by dividing the plurality of first offsets by d2 separately; removing a decimal part of each of the multipliers to obtain multiple integer multipliers, multiplying d2 by the multiple integer multipliers to obtain a plurality of second offsets, separately multiplying the plurality of second offsets by a multiplier obtained by dividing K1 by K2 to obtain a plurality of third offsets, and translating corresponding pixels of the second image according to the plurality of third offsets to obtain a third image; and step 5: restoring a resolution of the third image from the second resolution K2 to the first resolution K1 to obtain a fourth image;

wherein the first image comprises M rows of pixels, the M rows of pixels are exposed by corresponding M lasers of the laser direct imaging device separately, the M lasers are uniformly disposed on a long side center-line of the mounting plate of the laser direct imaging device, the mounting plate is disposed between the first horizontal rail and the second horizontal rail of the laser direct imaging device, and an angle β is an included angle of the mounting plate that is tilted relative to a vertical direction perpendicular to the first horizontal rail and the second horizontal rail;

wherein determination of the included angle β is as follows: a first linear displacement detection module disposed on the laser direct imaging device detects first displacement a1, wherein the first displacement a1 is a horizontal offset of a first laser at an end of the mounting plate that is tilted relative to the first laser at the end of the mounting plate that is vertical; and a second linear displacement detection module detects second displacement a2, wherein the second displacement a2 is a horizontal offset of an M-th laser at another end of the mounting plate that is tilted relative to the M-th laser at the another end of the mounting plate that is vertical, a distance between the first laser and the M-th laser is d, and $$\beta = arctg\frac{a1 + a2}{d}$$

according to an inverse tangent formula;

wherein the obtaining a plurality of first offsets, each first offset is corresponding to a respective pixel of the first image, comprises:

step 21: determining a sidelength of each pixel of the first image as d1 μm, wherein d1=25400/K1, a distance between every two adjacent lasers is d1, and d=(M−1)*d1; and setting an intersection point of a long side centerline of the mounting plate in a vertical state and a long side centerline of the mounting plate in a tilted state as point D, and setting a laser located at the point D as a reference laser, wherein a horizontal displacement of the reference laser is not changed when the mounting plate is deflected from the vertical state to the tilted state;

step 22: setting a distance from a Q-th laser among (M−1) lasers other than the reference laser to the reference laser as $S_Q$, and setting horizontal displacement of the Q-th laser as $f_Q$, wherein $f_Q=S_Q*tg\beta$; and step 23: moving pixels in each column of the first image corresponding to the Q-th laser by a horizontal offset of $f_Q$ in a reverse direction to obtain the plurality of first offsets;

wherein the reverse direction refers to a direction opposite to an offset direction of the lasers, Q is a variable, and 1≤Q≤M−1.

2. The image processing method of claim 1, wherein in step 23, the pixel corresponding to the Q-th laser refers to a pixel exposed by the Q-th laser.

3. The image processing method of claim 1, wherein in step 4, the translating corresponding pixels of the second image according to the plurality of third offsets to obtain the third image is automatically implemented under a control of a host computer in the laser direct imaging device.

4. The image processing method of claim 1, wherein a number of lasers on the mounting plate is equal to a number of rows of pixels in the first image to be exposed.

5. The image processing method of claim 1, wherein K2 is an integer multiple of K1.

6. A non-transitory storage medium, which is configured to store a computer program, wherein when executed by a processor, the computer program causes the processor to perform an image processing method comprising:

step 1: setting a resolution of a first image to be exposed as a first resolution K1;

step 2: obtaining a plurality of first offsets; each first offset corresponding to a respective pixel of the first image;

step 3: processing the first image to obtain a second image with a second resolution K2, wherein K2 is greater than K1;

step 4: calculating a size d2 of any pixel of the second image according to the second resolution K2; obtaining multipliers by dividing the plurality of first offsets by d2 separately; removing a decimal part of each of the multipliers to obtain multiple integer multipliers, multiplying d2 by the multiple integer multipliers to obtain a plurality of second offsets, separately multiplying the plurality of second offsets by a multiplier obtained by dividing K1 by K2 to obtain a plurality of third offsets, and translating corresponding pixels of the second image according to the plurality of third offsets to obtain a third image; and step 5: restoring a resolution of the third image from the second resolution K2 to the first resolution K1 to obtain a fourth image;

wherein the first image comprises M rows of pixels, the M rows of pixels are exposed by corresponding M lasers of a laser direct imaging device separately, the M lasers are uniformly disposed on a long side centerline of a mounting plate of the laser direct imaging device, the mounting plate is disposed between a first horizontal rail and a second horizontal rail of the laser direct imaging device, and an angle β is an included angle of the mounting plate that is tilted relative to a vertical direction perpendicular to the first horizontal rail and the second horizontal rail;

wherein determination of the included angle β is as follows: a first linear displacement detection module disposed on the laser direct imaging device detects first displacement a1, wherein the first displacement a1 is a horizontal offset of a first laser at an end of the mounting plate that is tilted relative to the first laser at the end of the mounting plate that is vertical; and a second linear displacement detection module detects second displacement a2, wherein the second displacement a2 is a horizontal offset of an M-th laser at another end of the mounting plate that is tilted relative to the M-th laser at the another end of the mounting plate that is vertical, a distance between the first laser and the M-th laser is d, and $$\beta = \arctan \frac{a1 + a2}{d}$$

according to an inverse tangent formula;

wherein the obtaining a plurality of first offsets, each first offset corresponding to a respective pixel of the first image, comprises:

step 21: determining a sidelength of each pixel of the first image as d1 μm, wherein d1=25400/K1, a distance between every two adjacent lasers is d1, and d=(M−1)*d1; and setting an intersection point of a long side centerline of the mounting plate in a vertical state and a long side centerline of the mounting plate in a tilted state as point D, and setting a laser located at the point D as a reference laser, wherein a horizontal displacement of the reference laser is not changed when the mounting plate is deflected from the vertical state to the tilted state;

step 22: setting a distance from a Q-th laser among (M−1) lasers other than the reference laser to the reference laser as $S_Q$, and setting horizontal displacement of the Q-th laser as $f_Q$, wherein $f_Q$ $S_Q$*tgβ; and step 23: moving pixels in each column of the first image corresponding to the Q-th laser by a horizontal offset of $f_Q$ in a reverse direction to obtain the plurality of first offsets;

wherein the reverse direction refers to a direction opposite to an offset direction of the lasers, Q is a variable, and 1≤Q≤M−1.

7. The non-transitory storage medium of claim 6, wherein in step 23, the pixel corresponding to the Q-th laser refers to a pixel exposed by the Q-th laser.

8. The non-transitory storage medium of claim 6, wherein a number of lasers on the mounting plate is equal to a number of rows of pixels in the first image to be exposed.

9. The non-transitory storage medium of claim 6, wherein K2 is an integer multiple of K1.

10. A computer device, comprising a memory, a processor, and a computer program stored in the memory and executable by the processor, wherein the processor, when executing the program, performs an image processing method comprising:

step 1: setting a resolution of a first image to be exposed as first resolution K1;

step 2: obtaining a plurality of first offsets; each first offset corresponding to a respective pixel of the first image;

step 3: processing the first image to obtain a second image with a second resolution K2, wherein K2 is greater than K1;

step 4: calculating a size d2 of any pixel of the second image according to the second resolution K2; obtaining a plurality of multipliers by dividing the plurality of first offsets by d2 separately; removing a decimal part of each of the multipliers to obtain multiple integer multipliers, multiplying d2 by the multiple integer multipliers to obtain a plurality of second offsets, separately multiplying the plurality of second offsets by a multiplier obtained by dividing K1 by K2 to obtain a plurality of third offsets, and translating corresponding pixels of the second image according to the plurality of third offsets to obtain a third image; and step 5: restoring a resolution of the third image from the second resolution K2 to the first resolution K1 to obtain a fourth image;

wherein the first image comprises M rows of pixels, the M rows of pixels are exposed by corresponding M lasers of a laser direct imaging device separately, the M lasers are uniformly disposed on a long side centerline of a mounting plate of the laser direct imaging device, the mounting plate is disposed between a first horizontal rail and a second horizontal rail of the laser direct imaging device, and an angle β is an included angle of the mounting plate that is tilted relative to a vertical direction perpendicular to the first horizontal rail and the second horizontal rail;

wherein determination of the included angle β is as follows: a first linear displacement detection module disposed on the laser direct imaging device detects first displacement a1, wherein the first displacement a1 is a horizontal offset of a first laser at an end of the mounting plate that is tilted relative to the first laser at the end of the mounting plate that is vertical; and a second linear displacement detection module detects second displacement a2, wherein the second displacement a2 is a horizontal offset of an M-th laser at another end of the mounting plate that is tilted relative to the M-th laser at the another end of the mounting plate that is vertical, a distance between the first laser and the M-th laser is d, and $$\beta = arctg\frac{a1 + a2}{d}$$

according to an inverse tangent formula;

wherein the obtaining a plurality of first offsets, each first offset corresponding to a respective pixel of the first image, comprises:

step 21: determining a sidelength of each pixel of the first image as d1 μm, wherein d1=25400/K1, a distance between every two adjacent lasers is d1, and d=(M−1) *d1; and setting an intersection point between a long side centerline of the mounting plate in a vertical state and a long side centerline of the mounting plate in a tilted state as point D, and setting a laser located at the point D as a reference laser, wherein a horizontal displacement of the reference laser is not changed when the mounting plate is deflected from the vertical state to the tilted state;

step 22: setting a distance from a Q-th laser among (M−1) lasers other than the reference laser to the reference laser as $S_Q$, and setting horizontal displacement of the Q-th laser as $f_Q$, wherein $f_Q = S_Q * tg\beta$; and step 23: moving pixels in each column of the first image corresponding to the Q-th laser by a horizontal offset of $f_Q$ in a reverse direction to obtain the plurality of first offsets;

wherein the reverse direction refers to a direction opposite to an offset direction of the lasers, Q is a variable, and 1≤Q≤M−1.

11. The computer device of claim 10, wherein in the step 23, the pixel corresponding to the Q-th laser refers to a pixel exposed by the Q-th laser.

12. The computer device of claim 10, wherein a number of lasers on the mounting plate is equal to a number of rows of pixels in the first image to be exposed.

13. The computer device of claim 10, wherein K2 is an integer multiple of K1.

* * * * *